United States Patent
Lodwig et al.

(10) Patent No.: US 6,697,012 B2
(45) Date of Patent: Feb. 24, 2004

(54) ALTITUDE ESTIMATION SYSTEM AND METHOD

(75) Inventors: Richard A. Lodwig, Gaithersburg, MD (US); Bonnie L. Adams, Gaithersburg, MD (US); Gregory A. Baker, Colorado Springs, CO (US)

(73) Assignee: Lockheed Martin Corporation, Gaithersburg, MD (US)

( * ) Notice: Subject to any disclaimer, the term of this patent is extended or adjusted under 35 U.S.C. 154(b) by 0 days.

(21) Appl. No.: 10/138,376

(22) Filed: May 6, 2002

(65) Prior Publication Data

US 2003/0006930 A1 Jan. 9, 2003

Related U.S. Application Data

(60) Provisional application No. 60/288,449, filed on May 4, 2001.

(51) Int. Cl.[7] ............................................. G01S 13/08
(52) U.S. Cl. .................... 342/120; 342/59; 342/118; 342/146; 342/147; 342/156; 342/417; 342/422; 342/423; 342/424
(58) Field of Search .................. 342/59, 118, 119–122, 342/128–133, 175, 195, 73–76, 89, 90, 94, 95, 96, 97, 98–103, 147, 156, 157, 417, 422–427

(56) References Cited

U.S. PATENT DOCUMENTS

| | | | | |
|---|---|---|---|---|
| 2,431,305 A | * | 11/1947 | Chatterjea et al. | 342/133 |
| 2,515,332 A | * | 7/1950 | Budenbom | 342/133 |
| 3,161,870 A | * | 12/1964 | Pincoffs | 342/59 |
| 3,184,739 A | * | 5/1965 | Franklin et al. | 342/59 |
| 3,487,462 A | * | 12/1969 | Holberg | 342/59 |
| 3,789,397 A | * | 1/1974 | Evans | 342/59 |
| 4,048,637 A | | 9/1977 | Jacomini | |
| 4,595,925 A | | 6/1986 | Hansen | |
| 4,751,511 A | * | 6/1988 | Komata et al. | 342/59 |
| 5,187,485 A | | 2/1993 | Tsui et al. | |
| 5,206,654 A | | 4/1993 | Finkelstein et al. | 342/410 |
| 5,252,980 A | * | 10/1993 | Gray et al. | 342/59 |
| 5,410,314 A | * | 4/1995 | Frush et al. | 342/59 |
| 5,703,594 A | | 12/1997 | Anderson | 342/123 |
| 6,011,515 A | | 1/2000 | Radcliffe et al. | 342/453 |
| 6,266,005 B1 | | 7/2001 | Schneider | 342/123 |
| 6,456,229 B2 | * | 9/2002 | Wurman et al. | 342/59 |
| 6,462,699 B2 | * | 10/2002 | Wurman et al. | 342/59 |

FOREIGN PATENT DOCUMENTS

| | | |
|---|---|---|
| GB | 1529381 A | 10/1978 |
| WO | 99/36796 A1 | 1/1999 |

OTHER PUBLICATIONS

International Search Report dated Dec. 2, 2002 for PCT/US02/14071.

* cited by examiner

Primary Examiner—Bernarr E. Gregory
(74) Attorney, Agent, or Firm—Hogan & Hartson L.L.P.

(57) ABSTRACT

A system and method for detecting and tracking a target object, including the calculation of the target object's altitude, is disclosed. During the processing of signals received by a receiver, the system selectively calculates the altitude of the target object from signals modified by an interference effect pattern formed by the signals broadcast by a transmitter, or from the calculation of geometric shapes associated with three or more transmitters and determining the intersection point of those shapes.

42 Claims, 6 Drawing Sheets

ALTITUDE ESTIMATION SYSTEM AND METHOD

CROSS REFERENCE TO RELATED APPLICATIONS

This application claims benefit of U.S. Provisional Application No. 60/288,449 entitled "PCL Altitude Estimation Method and System" and filed May 4, 2001, which is hereby incorporated by reference.

BACKGROUND OF THE INVENTION

1. Field of the Invention

The present invention relates to target object detection and tracking, and more particularly, to a system and method for determining the location, including altitude, of a target object.

2. Discussion of the Related Art

The detection and tracking of a target object has typically been accomplished with radio detection and ranging, commonly known as radar. Radar emits electromagnetic energy and detects the reflected energy scattered by the target object. By analyzing the time difference of arrival (TDOA) and the direction of the reflected signal, the location of a target object can be discerned. By analyzing the frequency shift of the energy beam due to the Doppler effect, moving targets are differentiated from stationary objects.

Radar is typically an active device including its own transmitters and receivers. Signals sent by the transmitters are typically of two types—pulse beams, or continuous wave.

A pulse beam transmitter generates intermittent signals with a specified delay between each signal. The delay between the pulsed signal provides the radar system a listening period to detect reflections from target objects. A pulse beam radar system determines the range of a target object by observing the TDOA, allowing the system to calculate the total distance traveled by the signal to and from the target object.

A continuous wave transmitter provides a constant, uninterrupted signal. A continuous wave radar system must detect reflected signals while it also broadcasts its direct signal. The continuous wave radar system relies on the Doppler effect to determine a target object's radial velocity to the receiver. An unmodulated continuous wave radar system is incapable of determining the range of an object. This is so due to its inability to mark the time a signal was sent and received; thus, it is unable to observe a TDOA in the signal. Whereas, a modulated or coded continuous wave provides a way to determine when a specific section of the signal was sent and received. With a marked signal, a system is able to determine the TDOA, allowing the determination of the range of a target object.

The electromagnetic radiation used in a radar system may be of any frequency, or, as the continuous wave example above illustrates, of varying frequencies, as long as it is of sufficient signal strength to provide a detectable reflected signal. Due to various advantages, microwaves are primarily used in modern radar systems. Microwaves are particularly well suited for radar due to their lobe size, the distance between the half-power points of the signal. Beam widths of a microwave signal are on the order of 1 degree, or just a few centimeters in cross-section, allowing for accurate determination of angles with moderate receiver sizes.

Radar systems also come in various receiver/transmitter configurations, such as Monostatic, Bistatic, and Multistatic.

Monostatic systems combine the receiver and transmitter. Noise and system integration issues are inherent in such a system. Furthermore, a transmitter broadcasting a detectable signal that is co-located with the receiver clearly presents a disadvantage in a military application.

Bistatic radar systems separate the receiver and transmitter from one another by significant distances. In a military application the separation of the transmitter and receiver reduces the possibility of destruction of both the transmitter and receiver if enemy forces detect the location of the transmitter. A bistatic radar system typically calculates the location of a target object by determining the distances between the transmitter, target, and receiver, known as the bistatic triangle.

Multistatic radar systems are similar to bistatic systems in that the transmitters and receivers are placed a distance apart. The difference is that multistatic systems implement multiple receivers and/or transmitters, which are coordinated to monitor a specific area.

Elevation calculation estimates made by radar systems are generally accomplished in one of two methods, sequential lobing or simultaneous lobing. Sequential lobing involves generating a sequence of beams at varying angles of elevation. The proportion of the reflected signals from each beam allows the elevation angle of the object to the receiver to be determined. The altitude of the target object is then calculated from the angle of elevation and the range of the target object.

Calculations made by a sequential lobing system are complicated when attempting to determine the elevation of a moving target. The sequential nature of this type of lobing system allows a moving target to change position between the successive lobes. Additionally, at microwave frequencies, an object such as an airplane is a few thousand wavelengths in size. Such a complex object, notwithstanding movement, will provide a wide range of scattering cross-sections for beam reflection.

Simultaneous lobing, also known as mono-pulse, reduces the complexities associated with a complex and moving target by broadcasting two or more beams simultaneously. These beams are known as the difference and sum beams. The simultaneous lobing system computes the ratio, providing a linear measurement between 1 and −1, of the two or more beams to determine the elevation angle at which the object is located.

Elevation angles calculated by radar systems are always a derived, rather than a measured quantity. The accurate calculation of height from microwave radar must always take into account the location and orientation of the radar antenna, the curvature of the earth, the refractive properties of the atmosphere, and the reflective nature of the earth's surface.

Furthermore, weather and humidity will also create variations in measurements due to the refraction created by moisture in the air. For example, clouds and/or rain will bend or distort the direction of the direct beam, as well as the reflection from the target object.

A factor further limiting accuracy in the detection and tracking of a target object is the interference effect patterns generated by transmitters of any electromagnetic signal. The interference effect patterns are the combination of signals broadcast by a transmitter and signals broadcast by the transmitter and reflected by the surrounding terrain. Due to the additional distance traveled by the signals reflected by the terrain they combine with the direct signals creating a combined signal that has been changed by phase differences of the signals.

These and other deficiencies exist in current object detection and tracking systems. Therefore, a solution to these problems is needed, providing an object detection and tracking system specifically designed to more accurately calculate the altitude of a target object.

SUMMARY OF THE INVENTION

Accordingly, the present invention is directed to a tracking and detection system and method.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof, as well as the appended drawings.

In one embodiment the invention comprises a system for detecting and tracking the location of a target object using signals transmitted by one or more independent transmitters, including an antenna for receiving the transmitted signals, a signal processing subsystem connected to the antenna for generating signal data by processing the signals received by the antenna, an object location processing subsystem connected to the signal processing subsystem for calculating target data including the location of the target object based on the signal data received from the signal processing subsystem, and is capable of calculating altitude data of the target object from signal data including signal data from one or more signals received by the antenna of an interference effect pattern from the one or more transmitters reflected by the target object, and a display subsystem for receiving target data from the object location processing subsystem and selectively displaying the target data of the target object.

In another embodiment, the invention comprises a system for detecting and tracking the location of a target object using signals transmitted by one or more independent transmitters, comprising an antenna for receiving the transmitted signals, a signal processing subsystem connected to the antenna for generating signal data by processing the signals received by the antenna, an object location processing subsystem connected to the signal processing subsystem for calculating target data including the location of the target object based on the signal data received from the signal processing subsystem, and is capable of calculating the location of the target object by calculating the intersections of geometric shapes associated with the three or more transmitters, and a display subsystem for receiving target data from the object location processing subsystem and selectively displaying the target data of the target object.

In a further embodiment the invention comprises a system for detecting and tracking the location of a target object using signals transmitted by one or more independent transmitters comprising, an antenna for receiving the transmitted signals, a signal processing subsystem connected to the antenna for processing the received signals, an object location processing subsystem connected to the signal processing subsystem for calculating target data including the location of the target object based on the signal data received by the signal processing subsystem, and is capable of selectively calculating altitude data of the target object by using signal data from an interference effect pattern of one or more transmitters or by calculating the intersections of geometric shapes associated with three or more transmitters, and a display subsystem for receiving target data from the object location processing subsystem and selectively displaying the target data of the target object.

In another embodiment the invention comprises a system for detecting and tracking the location of a target object, comprising, one or more transmitters for transmitting signals, an antenna for receiving the transmitted signals, a signal processing subsystem connected to the antenna for processing the received signals, an object location processing subsystem connected to the signal processing subsystem for calculating target data including the location of the target object based on the signal data received by the signal processing subsystem, and is capable of selectively calculating the altitude data of the target object by using signal data from an interference effect pattern of one or more transmitters or by calculating the intersections of geometric shapes associated with three or more transmitters, and a display subsystem for receiving target data from the object location processing subsystem and selectively displaying the target data of the target object.

In a further embodiment the invention comprises a method for detecting and tracking the location of a target object using signals transmitted by three or more transmitters, comprising the steps of receiving direct signals broadcast by the three or more transmitters, receiving reflected signals broadcast by the three or more transmitters and reflected by the target object, calculating a geometric shape associated with each of the three or more transmitters, and calculating the location of the target object using the geometric shapes.

In a further embodiment the invention comprises a method for detecting and tracking the location of a target object using signals transmitted by one or more transmitters, which form an interference effect pattern by the combination of a signal broadcast by the transmitter and a signal broadcast by the transmitter and reflected by the surrounding terrain, comprising the steps of receiving one or more signals broadcast by the one or more transmitters, receiving one or more reflected signals broadcast by the one or more transmitters and reflected by the target object, the reflected signal being modified by the interference effect pattern, and calculating the location of the target object using the direct signal and the reflected signal as modified by the interference effect pattern.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to various embodiments of the present invention, examples of which are illustrated in the accompanying drawings.

Figure 1:
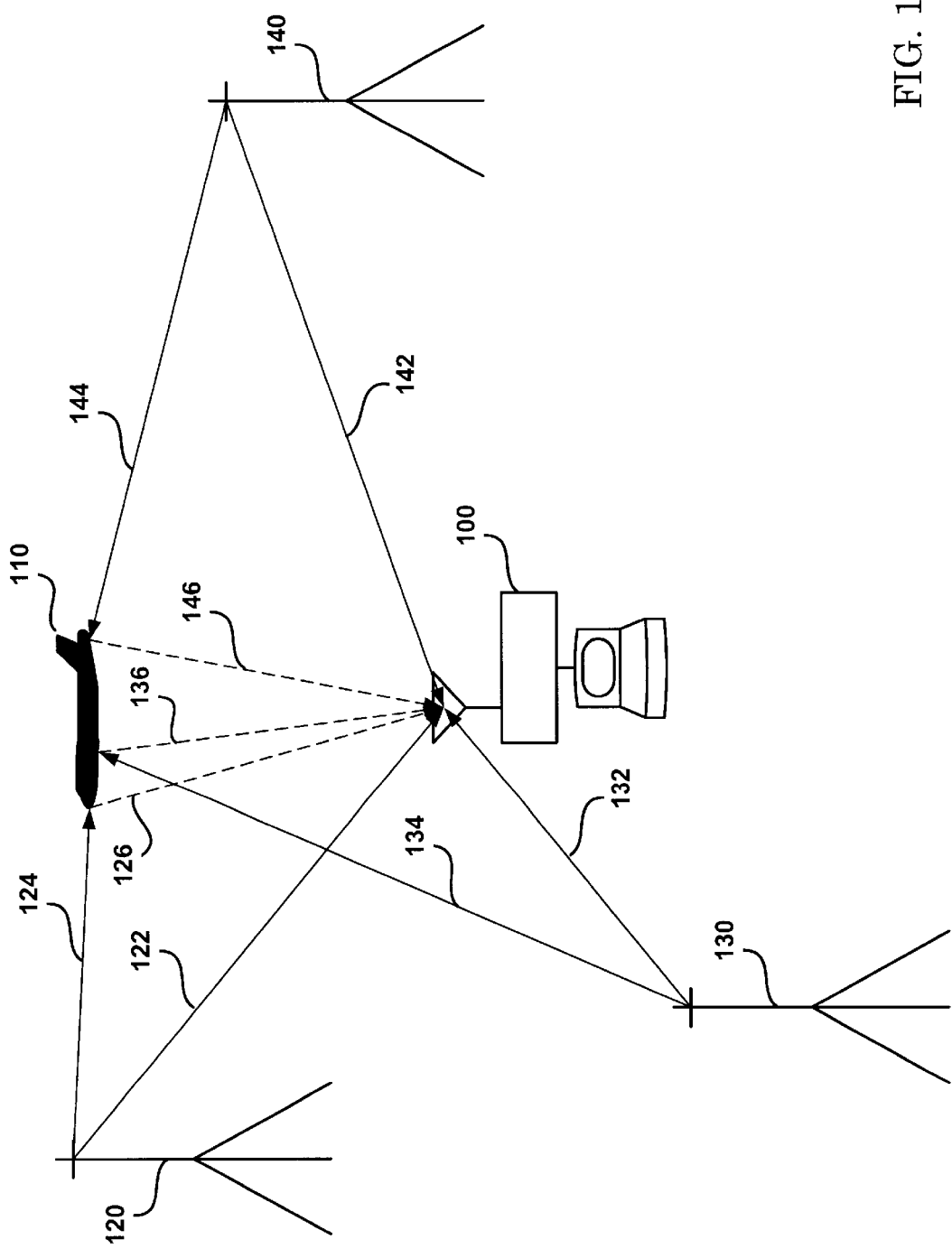
FIG. 1 shows a receiver, a target object, and a plurality of transmitters in accordance with the present invention.

FIG. 1 shows a receiver 100, a target object 110, and a plurality of transmitters 120, 130, and 140 in accordance with an embodiment of the present invention. Accordingly, the receiver 100 receives direct signals 122, 132, and 142 broadcast by the transmitters 120, 130, and 140, and reflected signals 126, 136, and 146. The reflected signals 126, 136, and 146 are signals 124, 134, and 144 broadcast by the transmitters 120, 130, and 140 that are reflected by a target object 110. The receiver 100 calculates the time-difference-of-arrival (TDOA), frequency-difference-of-arrival (FDOA, also known as the Doppler shift), and/or other information from the direct signals 122, 132, and 142 and the reflected signals 126, 136, and 146 to detect, and track the location of a target object 110. In further embodiments discussed in more detail below, additional signal patterns (shown in FIG. 2) generated by the transmitters 120, 130, and 140 and reflected by the target object 110 may also be used in the calculation of the target object's location.

Transmitters 120, 130, and 140 used by the receiver 100 typically broadcast signals in the VHF (30 MHz–300 MHz) range. This range of frequencies may include radio and television broadcast stations, national weather service transmitters, and radio-navigational beacons, such as VHF Omni-directional Range navigation systems (VOR). Further embodiments may also use frequency ranges outside or in combination with the VHF range.

Transmitters 120, 130, and 140 may or may not be under the operational control of the entity that controls the receiver 100. Thus, in an embodiment of the present invention, signals broadcast by transmitters 120, 130, and 140 are independent of (i.e., not controlled by) the entity controlling the receiver 100. For example, receiver 100 is capable of using commercial radio or television broadcasts. Further embodiments provide for the use of controlled transmitters, as well as any combination of controlled and independent transmitters. Additionally, further embodiments of the present invention may include fewer than, or more than, the three transmitters shown in FIG. 1.

In one embodiment of the present invention, the receiver 100 processes any signal received within the receiver's reception frequency range. In a further embodiment, the receiver 100 is capable of selecting a subset of signals. The subset may be an optimal subset based on the broadcasting transmitter's location, signal strength, signal frequency, or any other qualification used in the detecting and tracking of a target object.

The present invention is typically a multi-static configuration. Further embodiments may also include passive or bi-static configurations. Additionally, signals generated by transmitters used according to the present invention are typically continuous wave (CW) signals in the very high frequency (VHF) range; however, additional embodiments may also use pulsed signals or combinations of CW and pulsed signals. Further embodiments may also use frequency ranges other than, or in a addition to, VHF.

One embodiment of the present invention provides for the calculation of the location of a target object by calculating a geometric shape, such as an ellipsoid, for each transmitter. The geometric shape may be based on the total distance traveled by the reflected signal, the transmitter and receiver location. The intersection of three or more shapes provides the location of the target object in three dimensions. A further embodiment includes the calculation of the altitude of the target object by determining the location a target object enters an interference effect pattern surrounding a transmitter.

Figure 2:
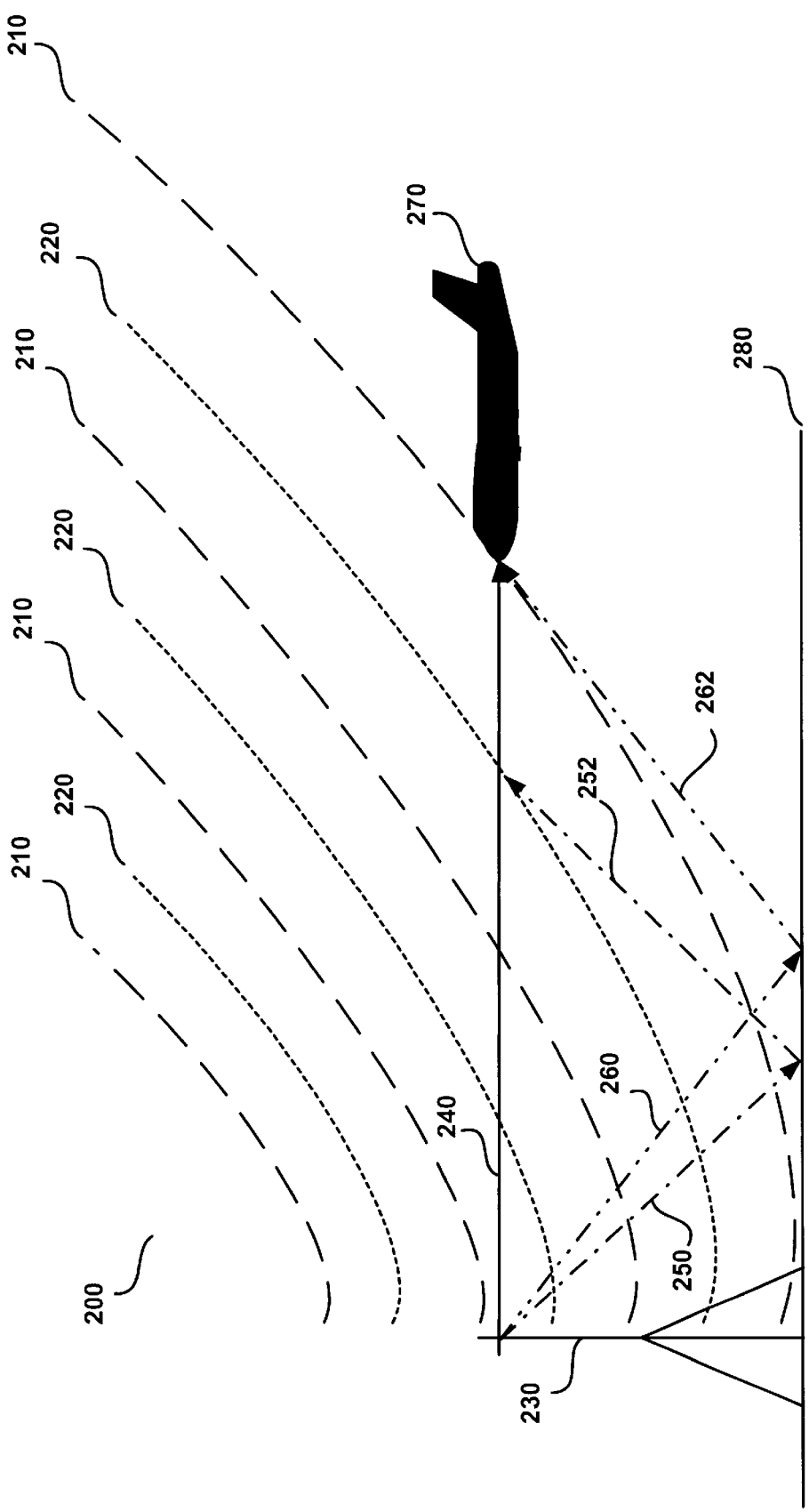
FIG. 2 depicts an interference effect pattern generated by a transmitter.

FIG. 2 depicts an interference effect pattern generated by a transmitter. In order to determine an altitude measurement with an interference effect pattern, the measurements of the interference effect pattern for, or by, the receiver 100. Turning to FIG. 2 specifically, an interference effect pattern 200 generally surrounds a device broadcasting radio frequency signals. Near the transmitter 230, a signal 240 combines with signals 252 and 262 to develop the interference effect pattern 200. Depending on the distance traveled by the signals 252 and 262, the combination with the signal 240 may be in-phase, out-of-phase, or anywhere in between. An in-phase combination doubles the amplitude of the resulting signal, while an out-of-phase combination cancels the signal. Furthermore, the beam width of the combined signals is approximately ⅓ that of the original signal. The resulting interference effect pattern 200 for a transmitter 230 provides well-defined signal layers varying between in-phase layers 210 and out-of-phase layers 220. Due to the shape of the interference effect pattern 200, a unique signal pattern is available at horizontal cross-sections of the interference effect pattern 200 as elevation increases.

According to an embodiment of the present invention, the interference effect pattern 200 may be used to effectively calculate the altitude of a target object 270. A target object 270 entering an interference effect pattern 200 will reflect the signals (252 and 262) of the interference effect pattern 200 in the same manner as signal 240, or other reflected signals. The receiver of the present invention will also receive the reflected signals 252 and 262 in the same manner as a signal 240, or other reflected signals.

According to the present invention, the receiver calculates the altitude of a target object from the interference effect pattern 200 reflected by the target object 270. Interference effect pattern data is stored in the receiver. The receiver calculates the target object's altitude by comparing the stored interference effect pattern data with the range and azimuth of the target object 270 to determine at what point in altitude the target object entered the interference effect pattern 200. An embodiment of the receiver calculates the range, azimuth, and altitude for the target object 270 concurrently. Further embodiments allow for calculating the range, azimuth, and altitude in any sequence or timeframe. After an initial determination of the target object's altitude, the receiver tracks the altitude of the target object 270 as it passes through the interference effect pattern 200.

For a transmitter 230 located on a flat surface, the interference pattern data associated with the interference pattern 200 can be calculated using fundamental geometry and data known about the transmitter's signal. For uneven terrains, topographical data, as well as other surface structure data, may be introduced to provide an additional accuracy to the calculation of the interference pattern data.

According to one embodiment of the present invention, interference pattern data is calculated for individual transmitters by an external interference calculation tool. The data created by the interference calculation tool is then loaded into the receiver. A further embodiment provides for the interference calculation tool to be incorporated with the receiver.

Figure 3:
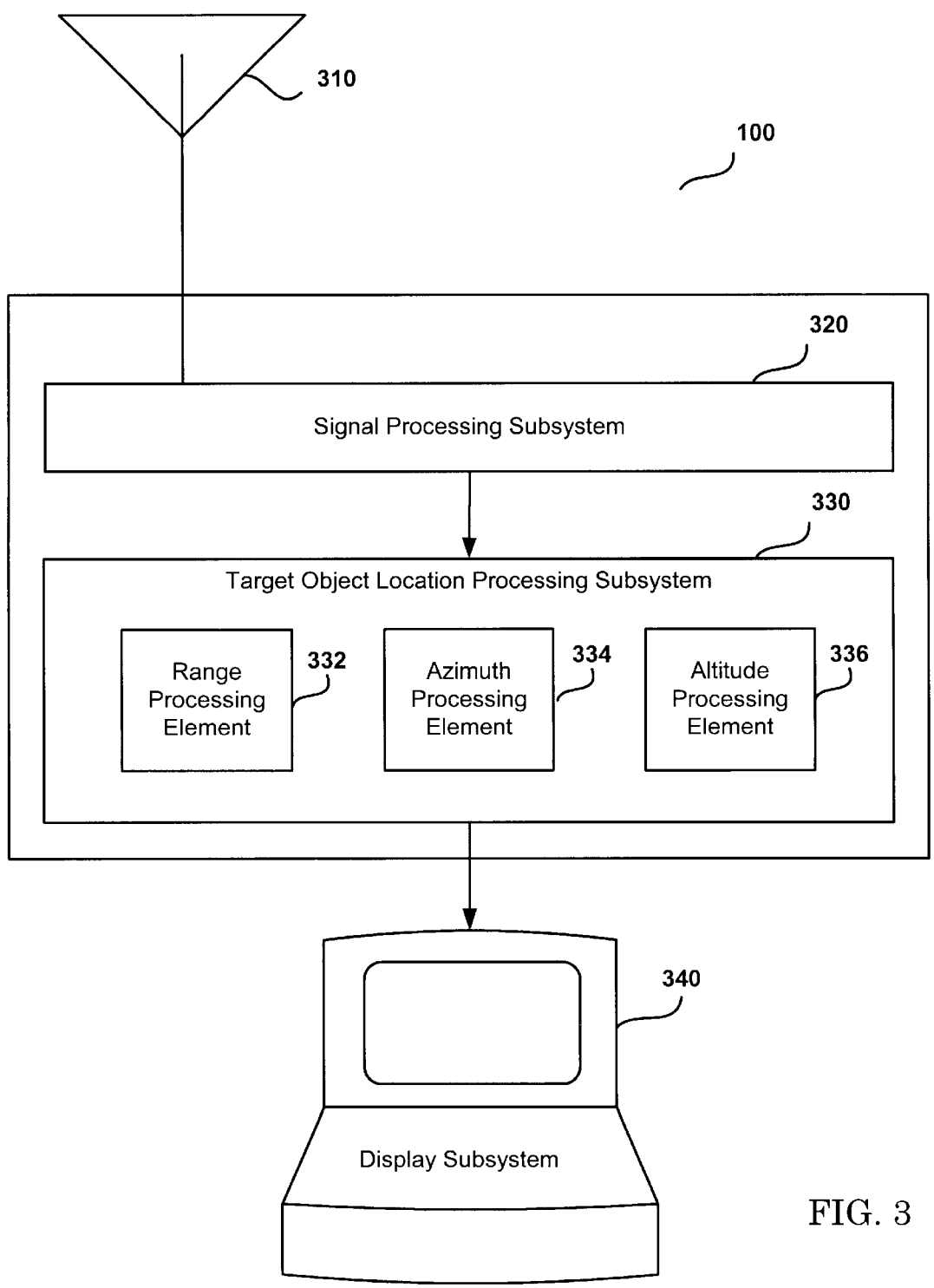
FIG. 3 shows a block diagram of the receiver in accordance with the present invention.

FIG. 3 shows a block diagram of the receiver 100 in accordance with an embodiment of the present invention. The receiver 100 includes an antenna 310, a signal processing subsystem 320, a target object location processing subsystem 330, and a display subsystem 340. Each of the subsystems is interconnected by a communications link, which may be a system bus, a network connection, a wireless network connection, or any other suitable communications link.

The antenna 310 receives electromagnetic transmissions, including the signals broadcast by the transmitters, as well as various signals reflected by a target object. The antenna 310 may be of any type capable of receiving the frequency range of the signals used by the attached embodiment of the receiver 100. For example, various embodiments of the antenna 310 include a linear phased array, a single element antenna, or a whip antenna. Further embodiments may also include various combinations of antenna types.

The signal processing subsystem 320 receives the output of the antenna 310. In one embodiment, the signal processing subsystem 320 may be tuned to receive transmissions of a particular frequency range plus or minus a predetermined variance. The variance may be coordinated to allow for expected Doppler shift in the signal frequencies. One embodiment of the signal processing subsystem digitizes the signals and reflected signals and outputs the digitized data representing the signals to the target object location processing subsystem 330. A further embodiment may output analog data to the target object location processing subsystem 330.

The target object location processing subsystem 330 receives the signal data from the signal processing subsystem 320. The target object location processing subsystem 330 includes a range processing element 332, an azimuth processing element 334, and an altitude processing element 336. The target object location processing subsystem 330 calculates the three-dimensional location of a target object. Various calculations made by the range processing element 332, azimuth processing element 334, and altitude processing element 336 may be redundant.

In further embodiments, the redundant calculations may be used to validate measurements made by the various elements 332, 334, and 336. For example, an altitude calculation may also provide a range and/or azimuth measurement. These range and azimuth measurements may be compared to the range and/or azimuth measurements calculated by the range processing element 332 and/or the azimuth processing element 334 to validate the measurements or tolerances of the altitude processing element 336. Another embodiment may avoid the calculation of redundant information, such as eliminating the calculations of the range element 332 and azimuth element 334 when these measurement will be made by the altitude element 336.

The target object location processing subsystem 330, including its range, azimuth, and altitude elements 332, 334, and 336, may be present on a single processing unit. Likewise, the signal processing subsystem 320 and the target object location processing subsystem 330 may be present on a single processing unit. Further embodiments provide for each subsystem and feature to reside on one or more processing units, or combined in various combinations across one or more processors.

The altitude processing element 336 provides for various methods of calculating the altitude of a target object, including the use of an interference effect pattern and/or the geometrical shape calculation. Geometrical shape calculations may use the known locations of the receiver 100, and transmitters, and the distance traveled by a reflected signal to calculate geometric shapes associated with each transmitter.

The intersection of the geometrical shapes for three transmitters provides two points at which the target object may be located. Generally, one of the points can be excluded as an unlikely position for the target object. For example, one of two intersection points may be below the earth's surface. When tracking a flying target object, this point can clearly be excluded. The intersection of more than three geometric shapes provides a single point and allows for increasing precision as additional transmitters are used to create geometric shape measurements. The precision increase is provided by statistical confirmation of the various intersection calculations provided by additional measurements. In a further embodiment, transmitters providing geometric shape measurements that are clearly outside a statistically acceptable accuracy can be excluded from the current measurements.

In accordance with a further embodiment, the altitude processing element 336 also provides for the calculation of the altitude of a target object using the interference effect pattern data calculated for each transmitter used in the altitude calculation. As discussed earlier, transmitters broadcasting electromagnetic energy broadcast energy, including the side-lobes of the signal, in multiple directions. Energy directed toward the terrain is reflected and combines with signals at varying degrees between in-phase and out-of-phase depending on the distance traveled by the reflected signals. The combined signals create an interference effect pattern surrounding the transmitter forming patterns of energy that vary between in-phase and out-of-phase layers.

Each layer increases its distance from the transmitter as it increases in altitude, rising away from the transmitter. Horizontal cross-sections of the interference effect pattern generally widen as altitude increases and provides a unique pattern at differing levels of elevation. A target entering the interference effect pattern at a specific range, azimuth, and altitude will enter the interference pattern at a specific location from the transmitter. Once a target object enters the interference effect pattern, its altitude can be monitored as it enters and exits the various layers of the pattern.

The target object location processing subsystem 330 is connected with, and provides target object data to, the display subsystem 340. The display subsystem 340 selectively displays information calculated by the target object processing subsystem 330. The display subsystem 340 may include a LCD or CRT display tube, projection screen, or any other device capable of presenting display information to a user.

Display information may include a target objects location in range, azimuth, and altitude, current velocity, direction of travel, etc. . . . . . A further embodiment provides for an icon representation of the target object. Additional target object information, such as the velocity, altitude, etc., may be selectively added to the icon image. In one embodiment, the display subsystem 340 displays a map image background of the area being monitored by the receiver. The map image may be a typical road atlas style map, a satellite image, or any other image representing the monitored location. The target object may be indicated in various manners on the map image. A further embodiment provides for a path trail to be displayed for a target object indicating the path taken by that target object. Further embodiments provide for display of the receiver, transmitters, and/or landmark indicators.

Figure 4:
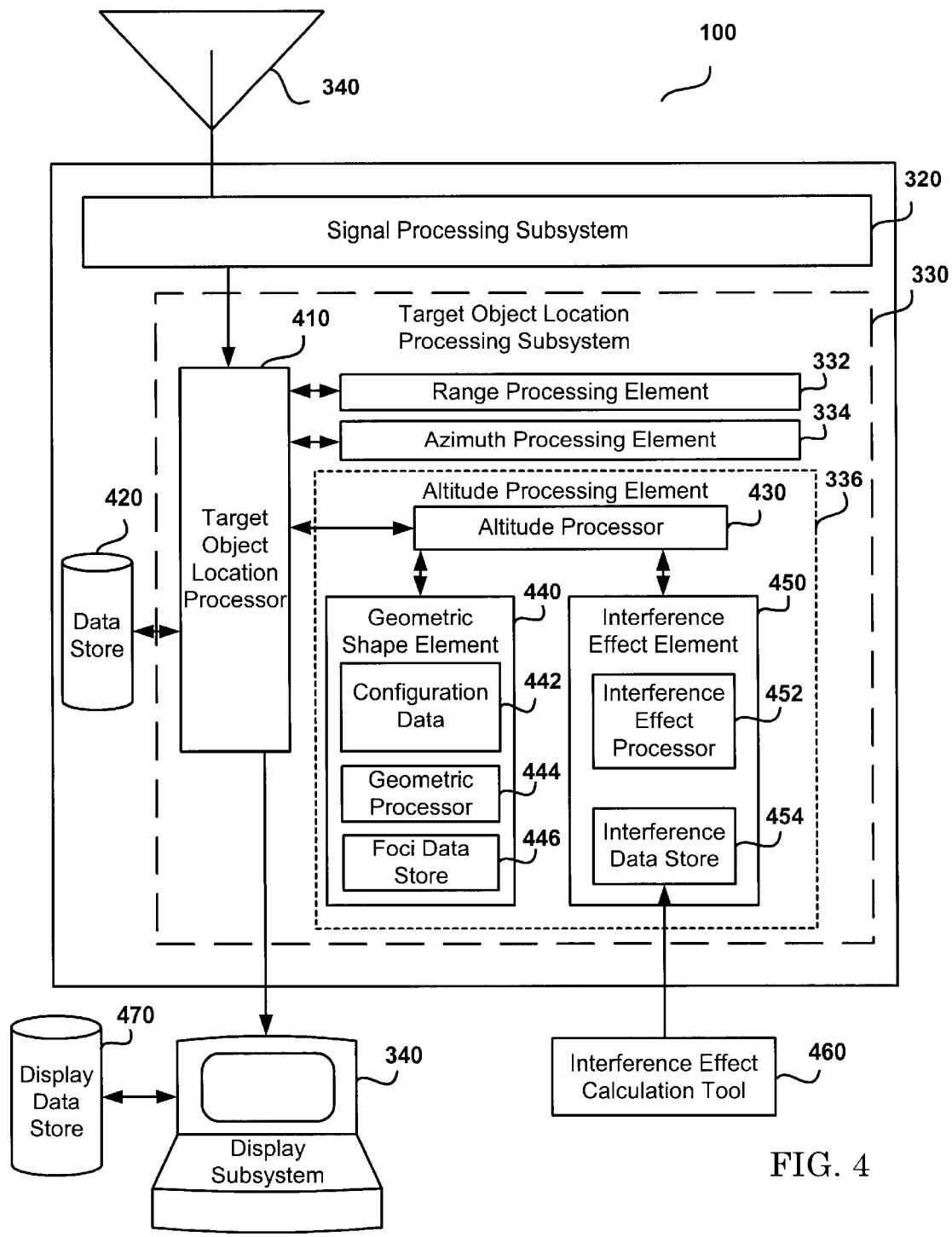
FIG. 4 shows a block diagram of a further embodiment of the receiver in accordance with the present invention.

FIG. 4 shows a block diagram of a further embodiment of receiver 100 in accordance with the present invention. This embodiment also includes an antenna 310, a signal processing subsystem 320, a target object location processing subsystem 330, a display subsystem 340. Each of the subsystems is interconnected by a communications link, which may be a system bus, a network connection, a wireless network connection, or any other suitable communications link.

Turning to FIG. 4, the antenna 340 receives electromagnetic transmissions and provides them to the signal processing subsystem 320. The signal processing subsystem 320 provides signal data to the target object location processing subsystem 330. Within the target object location processing subsystem 330, the target object location processor 410 receives the signal data. The target object location processor 410 is interconnected with the range processing element 332, the azimuth processing element 334, and the altitude processing element 336. The target object location processor receives the digitized signal data from the signal processing subsystem 320 and coordinates the processing of the three-dimensional components of a target object's location among the processing elements 332, 334, and 336 of the target object location processing subsystem 330. The target object location processor 410 also has access to data store 420 for storing and retrieving data used in the detection and tracking calculations of a target object.

The target object location processor 410 may be a single processor or multiple processors. The processor, or processors, used by the range processing element 332, azimuth processing element 334, and altitude processing element 336 may be the same processor or processors used as the target object location processor 410. Further embodiments provide for a dedicated processor or processors for the various processing elements and/or various combinations of the elements and processors.

The altitude processing element 336 of the embodiment shown in FIG. 4 includes an altitude processor 430, a geometric shape element 440, and an interference effect element 450. The altitude processor 430 coordinates the selection of the geometric shape element 440 and interference effect element 450 when calculating the altitude of a target object. Further embodiments provide the altitude processor with the ability to initiate altitude calculations on both the geometric shape element 440 and the interference effect element 450, or eliminate the geometric calculations or the interference effect calculations under various circumstances. In a further embodiment, the altitude processor 430 selects the best altitude element, geometrical shape element 440, or interference effect element 450, for calculating the altitude of a target object.

Selection of an altitude element is useful due to decreased efficiencies of the calculations in various circumstances. For example, the geometric dilution of precision is magnified over increasing distances for the geometric shape approach. Over large distances, the receiver, transmitters and target object are virtually co-planar; thus, the partial derivative of a signal's time difference of arrival as a function of height approaches zero.

The interference effect measurement should only be attempted, and is only possible, when a target object is irradiated with signals modified by an interference effect pattern. Thus, an interference effect calculation is only useful when a target object is within the interference effect pattern of one or more transmitters.

The geometric shape element includes a configuration data store 442, a geometric shape processor 444, and a foci data store 446. The configuration data store 442 maintains configuration data used in the geometric shape calculation. The configuration data may include such information as the range limits allowable for a calculation, allowing the geometric shape element 440 to notify the altitude processor 430 to include or exclude geometric shape calculations, the number of transmitters to be used for a calculation, or any other configuration information that may be useful in a calculation.

The geometric shape processor 444 processes the geometric shape calculations. As stated previously, this processor may be a single processor or multiple processors dedicated to the geometric shape calculation, or may be a processor or processors that are shared with other functions of the receiver 100.

The foci data store 446 maintains the physical locations of each transmitter and the receiver. The receiver and each transmitter used in a geometric shape calculation may become the foci for the individual geometric shape measurements.

Turning now to the interference effect element 450. The interference effect element 450 includes an interference effect processor 452 connected to an interference data store 454. Like the processors discussed earlier, the interference effect processor may be a single processor or multiple processors dedicated to the interference effect altitude calculation, or may be a processor or processors that are shared with other functions of the receiver 100.

The interference data store 454 stores interference effect pattern data generated by an interference effect calculation tool for each of the transmitters in the monitored area. The interference effect pattern data for each transmitter is based on the signal output by the transmitter, the topographical information for the terrain around the transmitter, and any other constant or variable data that provides an accurate simulation of the interference effect generated around a transmitter. A further embodiment provides for multiple sets of interference effect data for each transmitter to be stored and used by the interference effect element 450.

In one embodiment, the interference effect calculation tool 460 is a separate device that is connected to the interference data store 454 for loading the interference effect pattern data and is disconnected after the data has been loaded. A further embodiment incorporates the interference effect calculation tool 460 into the receiver.

Data is output by the target object location processing subsystem 330 to the display subsystem 340 for display. A display data store 470 is connected to the display subsystem providing a location for the display subsystem 340 to store historical target object data and/or a variety of other display data.

Figure 5:
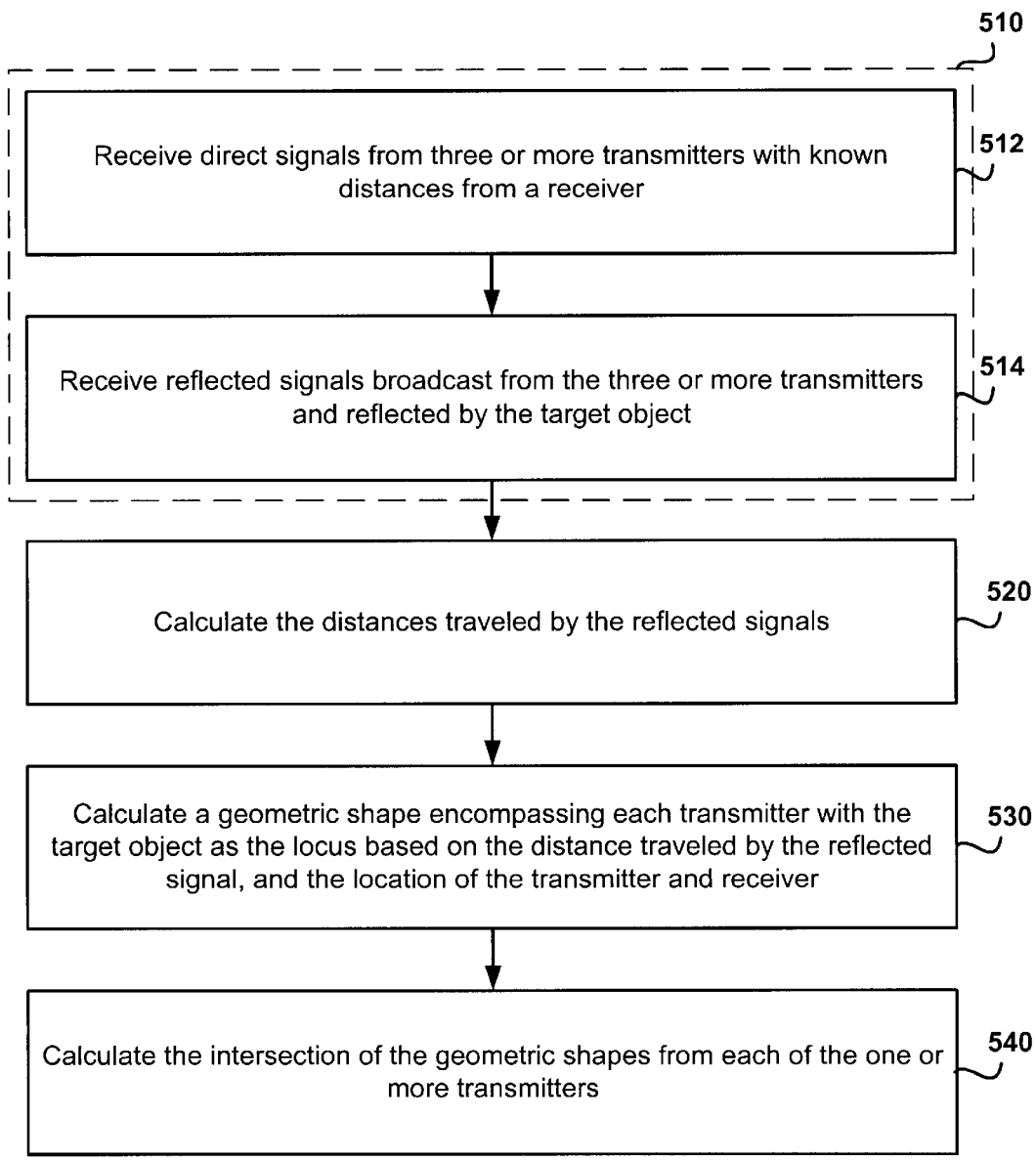
FIG. 5 is a flow diagram showing a method for detecting and tracking the location of a target object using the intersections of geometric measurements from three or more transmitters according to the present invention.

FIG. 5 is a flow diagram showing a method for detecting and tracking the location of a target object using the intersection of geometric measurements from three or more transmitters according to the present invention. In particular, the process initiates by receiving signals broadcast from the three or more transmitters, Step 510. According to the present invention, receiving signals from the three or more transmitters, Step 510, includes receiving signals broadcast directly from the transmitters, Step 512, as well as receiving signals broadcast from the transmitters and reflected by the target object, Step 512. In one embodiment, receiving the signals, Step 512, and reflected signals, Step 514, takes place concurrently. It should be appreciated that the sequence and/or timeframe of the receiving steps could be modified or adjusted as needed and may vary from that shown.

The distance traveled by each of the reflected signals is then calculated, Step 520. The distance traveled by a reflected signal can be determined with a known distance between a transmitter and a receiver, and the travel time of the reflected signal. With known locations of the transmitter and the receiver, the distance between them can be easily calculated by, or entered into the receiver. Due to the constant speed at which the direct and reflected signals travel, the speed of light, calculating the additional time traveled by the reflected signal provides the ability to calculate the total travel distance of the reflected signal. By monitoring both the direct signal and the reflected signal, travel time may be calculated by determining the time difference of arrival between the direct signal and the reflected signal.

When the total distance traveled by the reflected signal a transmitter is known, a geometric shape is formulated with the target object located on the locus of the shape, Step 530. For example, a geometric shape, such as an ellipsoid, can be calculated using the location of the receiver, the location of the transmitter broadcasting the reflected signal, and the total distance traveled by the reflected signal. The locus of the ellipsoid is formed from all points having the same total distance from the two foci (i.e., the distance traveled by the reflected signal). Thus, the target object is located on the locus of the calculated ellipsoid.

Once three or more geometric shapes are calculated, the intersection of the geometric shapes is resolved, Step 540. Because each geometric shape is derived with the target object located on the locus, the intersection point for the geometric shapes indicates the location of the target object. For an embodiment calculating an ellipsoid or a sphere as the calculated geometric shape, three transmitters provide two intersection points at which the target object could be located. As discussed above, one of these points can generally be excluded as unusable. Four transmitters providing intersecting shape calculations allow for a single intersection point. Additional transmitters provide increasing accuracy by allowing additional verification of the intersection point indicating the target object's location.

For an embodiment using an ellipsoid measurement, the foci locations for each ellipsoid are known, namely the receiver $F_R$ and each transmitter $F_1$, $F_2$, $F_3$, $F_N$. For each foci pair ($F_R$, $F_N$) the target object is located at point $P_N$ on the locus of the ellipsoid, the total distance ($D_N$) traveled by the reflected signal (transmitter ($F_N$)→target object (P)→receiver (F)) provides the distance to the locus. The total distance ($D_N$) is also the measurement necessary to calculate the semi-axes $a_N$, $b_N$, and $c_N$ of the ellipsoid. For example, where $F_R$ and $F_N$ are located on the x axis (F(f,0,0) and $F_N$(-f0,0)), and based on the fundamental equation of an ellipsoid $$\frac{x^2}{a^2} + \frac{y^2}{b^2} + \frac{z^2}{c^2} = 1,$$

the total travel distance $D_N$ of the reflected signal equals $2a_N$. For an ellipsoid having a constant distance $2a_N$, the distance of the semi-axes in the y and z directions will be equal ($b_N = c_N$); therefore, the distance from a foci to the intersection of the y and the z semi-axes is a. Thus, the semi-axes in the y and z direction can be calculated in the following manner—$a_N^2 = b_N^2 + f_N^2$.

Semi-axes $a_N$, $b_N$, and $c_N$ are calculated in a similar manner for each of the transmitters. The intersection point, the location of the target object, is solved where the three-dimensional coordinates, x, y, and z, are equivalent for each of the ellipsoids resulting in the three-dimensional location of the target object.

In order to monitor the location of a moving target object, the calculations of the geometric shapes are updated as the object changes location. In one embodiment, the calculations are processed in real-time to provide the current location of the target object. Further embodiments may store signal data for processing, or review, at a later time.

Figure 6:
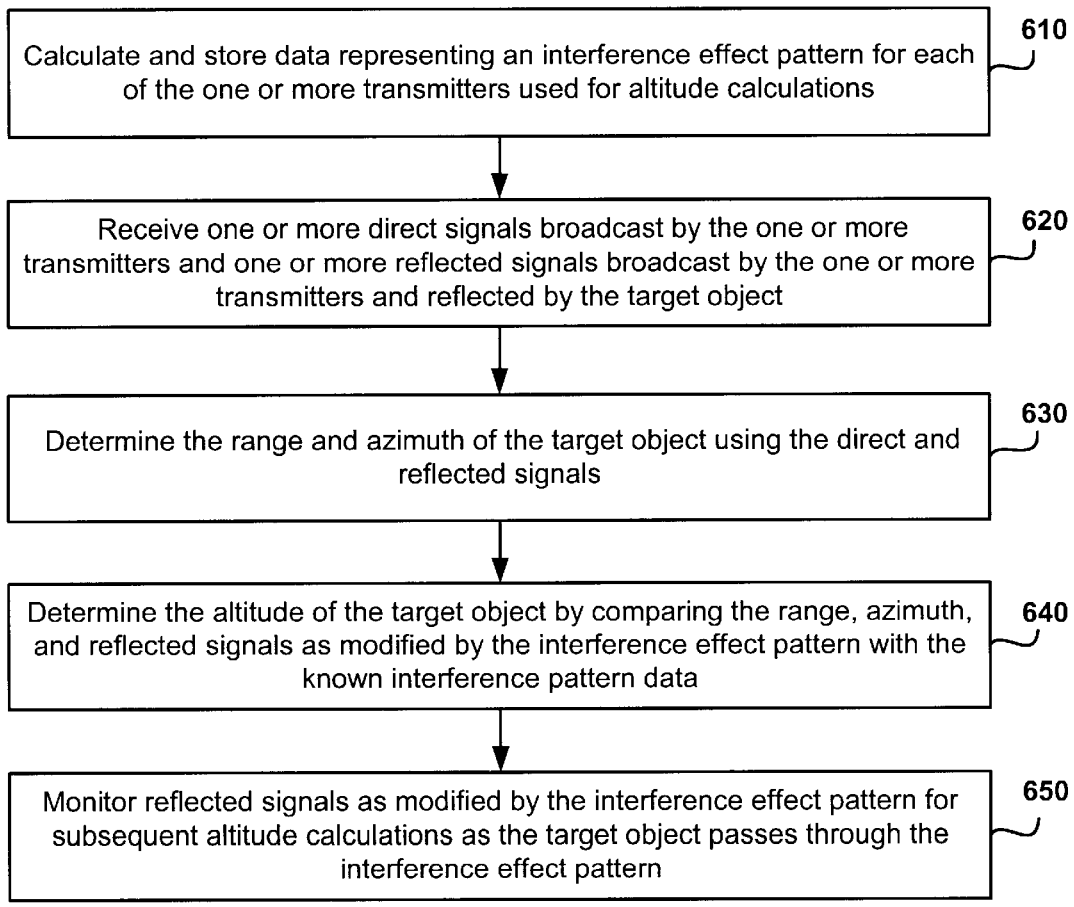
FIG. 6 is a flow diagram showing a method for detecting and tracking the altitude of a target object using an interference effect pattern from one or more transmitters in accordance with the present invention.

FIG. 6 is a flow diagram showing a method for detecting and tracking the altitude of a target object using an interference effect pattern from one or more transmitters. It should be appreciated that the sequence and/or timeframe of the steps in FIG. 6 could be modified or adjusted as needed and may vary from that shown. As discussed earlier, an interference effect pattern is generated around a transmitter broadcasting radio-frequency signals. The signals broadcast by the transmitter combine with signals reflected by the terrain to produce the interference effect pattern.

Turning to FIG. 6, interference effect pattern data representing the interference effect pattern for each transmitter, or set of transmitters, used to monitor a selected area is calculated and stored for use by a receiver, Step 610. The calculated interference effect pattern data is generally stored in a data store for ease of access during altitude calculations. In one embodiment, an interference effect calculation tool prepares and loads the interference effect pattern data into an interference effect data store in the receiver. In a further embodiment, the interference effect calculation tool is incorporated with the receiver.

Continuing with the method, the receiver receives signals broadcast by the transmitter and reflected signals broadcast by the transmitter and reflected by the target object, Step 620. As a target object enters an interference effect pattern, the target object reflects the signal as modified by the interference effect pattern.

The receiver calculates the range and azimuth of the target object by monitoring the signals and reflected signals, Step 630. By monitoring the signals and reflected signals the time difference of arrival of the reflected signals, as well as the frequency difference of arrival may be used to provide data for the calculation of the range and azimuth.

The receiver compares the range, azimuth, and reflected signal as modified by the interference effect pattern with the interference effect pattern data located in the data store to determine the altitude of the target object, Step 640. The expanding nature of the interference effect pattern at increasing altitudes provides unique horizontal cross-sections at differing altitudes. The cross-sections provide a template with which to compare the signal modified by the interference effect pattern and reflected by the target object and the target object's current range and azimuth with the interference effect pattern data to determine at which altitude the target object must have entered, or is currently located within, the interference effect pattern. Simply, a target object at a specific range, azimuth, and altitude will reflect a signal modified by an identifiable section of the interference effect pattern.

After a target object enters an interference effect pattern, the reflected signal as modified by the interference effect pattern is monitored to track any changes in altitude as the target object moves through the interference effect pattern, Step 650. In the same manner as discussed above, the cross-sections of the interference effect pattern provide a reflected signal with which to compare against the interference effect pattern data allowing the receiver to monitor the altitude of the target object.

It will be apparent to those skilled in the art that various modifications and variations can be made in the present invention without departing from the spirit or scope of the invention. Thus, it is intended that the present invention covers the modifications and variations of this invention provided that they come within the scope of any claims and their equivalents.

What is claimed is:

1. A system for detecting and tracking the location of a target object using direct signals transmitted by one or more independent transmitters and reflected signals transmitted by the one or more independent transmitters and reflected by the target object, comprising:

an antenna for receiving the direct and reflected signals;

a signal processing subsystem connected to the antenna for generating signal data by processing the direct and reflected signals received by the antenna;

an object location processing subsystem connected to the signal processing subsystem for calculating target data including the location of the target object based on the signal data received from the signal processing subsystem, wherein the object location processing subsystem calculates altitude data of the target object using signal data calculated from an interference effect pattern signal generated by the combination of the direct signal and a surface reflected signal from a transmitter of the one or more transmitters, reflected by the target object, and received by the antenna; and a display subsystem for receiving target data, including the altitude data, from the object location processing subsystem and selectively displaying the target data of the target object.

2. The system for detecting and tracking a target object of claim 1, wherein the object location processing subsystem further comprises a range processing element for calculating the range of the target object with the signal data received from the signal processing subsystem.

3. The system for detecting and tracking a target object of claim 1, wherein the object location processing subsystem further comprises an azimuth processing element for calculating the azimuth of the target object with the signal data received from the signal processing subsystem.

4. The system for detecting and tracking a target object of claim 1, wherein the object location processing subsystem further comprises an altitude processing element for calculating the altitude of the target object with the signal data received from the signal processing subsystem.

5. The system for detecting and tracking a target object of claim 1, wherein the object location processing subsystem further comprises an interference effect element for the dedicated processing of the interference effect pattern signal.

6. The system for detecting and tracking a target object of claim 5, wherein the interference effect element further comprises an interference effect processor for processing the signal data from the interference effect pattern signal.

7. The system for detecting and tracking a target object of claim 5, wherein the interference effect element further comprises an interference effect pattern data store for receiving and storing interference effect pattern data for each of the one or more independent transmitters.

8. The system for detecting and tracking a target object of claim 7, wherein the interference effect pattern data for the one or more independent transmitters is pre-calculated by an interference effect calculation tool for adaptively connecting to the system and transferring the interference effect pattern data to the interference effect pattern data store.

9. The system for detecting and tracking a target object of claim 7, wherein the interference effect pattern data for the one or more independent transmitters is calculated by the interference effect processor.

10. The system for detecting and tracking a target object of claim 7, wherein the interference effect pattern subsystem further comprises a topographical data store for adjusting interference effect pattern data for the one or more transmitters to the local topography.

11. The system for detecting and tracking a target object of claim 1, wherein the object location processing subsystem further comprises a target object location processor for receiving signal data from the signal processing subsystem and coordinating location calculations of the target object.

12. A system for detecting and tracking the location of a target object using signals transmitted by one or more independent transmitters, comprising:

an antenna for receiving the transmitted signals;

a signal processing subsystem connected to the antenna for generating signal data by processing the signals received by the antenna;

an object location processing subsystem connected to the signal processing subsystem for calculating target data, including the location of the target object, based on the signal data received from the signal processing subsystem, wherein the object location processing subsystem calculates the location of the target object by calculating the intersections of geometric shapes associated with the three or more transmitters, wherein each geometric share is calculated using the location of one transmitter, and the antenna as fixed points and the target object as a point on the locus of the geometric shape; and a display subsystem for receiving target data from the object location processing subsystem and selectively displaying the target data of the target object.

13. The system for detecting and tracking a target object of claim 12, wherein the object location processing subsystem further comprises a range processing element for calculating the range of the target object with the signal data received from the signal processing subsystem.

14. The system for detecting and tracking a target object of claim 12, wherein the object location processing subsystem further comprises an azimuth processing element for calculating the azimuth of the target object with the signal data received from the signal processing subsystem.

15. The system for detecting and tracking a target object of claim 12, wherein the object location processing subsystem further comprises an altitude processing element for calculating the altitude of the target object with the signal data received from the signal processing subsystem.

16. The system for detecting and tracking a target object of claim 12, wherein the object location processing subsystem further comprises a geometric shape element for calculating the geometric shapes associated with each transmitter, target object, and antenna grouping and an intersection of the calculated geometric shapes.

17. The system for detecting and tracking a target object of claim 16, wherein the geometric shape element further comprises a configuration data store for storing configuration data used in the geometric shape calculation.

18. The system for detecting and tracking a target object of claim 16, wherein the geometric shape element further comprises a geometric shape processor.

19. The system for detecting and tracking a target object of claim 16, wherein the geometric shape element further comprises a foci data store for storing the physical locations of the antenna and the one or more transmitters.

20. The system for detecting and tracking a target object of claim 12, wherein the object location processing subsystem further comprises a target object location processor for receiving signal data from the signal processing subsystem and coordinating location calculations of the target object.

21. A system for detecting and tracking the location of a target object using signals transmitted by one or more independent transmitters comprising:

an antenna for receiving the transmitted signals;

a signal processing subsystem connected to the antenna for processing the received signals;

an object location processing subsystem connected to the signal processing subsystem for calculating target data including the location of the target object based on the signal data received by the signal processing subsystem, wherein the object location processing subsystem selectively calculates altitude data of the target object by using signal data calculated from an interference effect pattern generated by one of the one or more transmitters and reflected by the target object, or calculating the intersections of geometric shapes associated with the three or more transmitters, wherein each geometric shape is calculated using the location of one transmitter, and the antenna as fixed points and the target object as a point on the locus of the geometric shape; and a display subsystem for receiving target data from the object location processing subsystem and selectively displaying the target data of the target object.

22. The system for detecting and tracking a target object of claim 21, wherein the object location processing subsystem further comprises an altitude processing element for calculating the altitude of the target object with the signal data received from the signal processing subsystem.

23. The system for detecting and tracking a target object of claim 22, wherein the altitude processing element further comprises an interference effect element for calculating the altitude of a target object using data from the interference effect pattern reflected by the target object.

24. The system for detecting and tracking a target object of claim 23, wherein the interference effect element further comprises an interference effect processor.

25. The system for detecting and tracking a target object of claim 23, wherein the interference effect element further comprises an interference effect pattern data store for receiving and storing interference effect pattern data for each of the one or more transmitters.

26. The system for detecting and tracking a target object of claim 22, wherein the altitude processing element further comprises a geometric shape processing element for calculating the location of the target object by determining the intersection of the geometrical shapes associated with three or more of the transmitters.

27. The system for detecting and tracking a target object of claim 21, wherein the object location processing subsystem further comprises a target object location processor for receiving signal data from the signal processing subsystem and coordinating location calculations of the target object.

28. A system for detecting and tracking the location of a target object comprising:

one or more transmitters for transmitting signals;

an antenna for receiving the transmitted signals;

a signal processing subsystem connected to the antenna for processing the received signals;

an object location processing subsystem connected to the signal processing subsystem for calculating target data including the location of the target object based on the signal data received by the signal processing subsystem, wherein the object location processing subsystem selectively calculates altitude data of the target object by using signal data calculated from an interference effect pattern generated by one of the one or more transmitters and reflected by the target object, or calculating the intersections of geometric shapes associated with the three or more transmitters wherein each geometric shape is calculated using the location of one transmitter, and the antenna as fixed points and the target object as a point on the locus of the geometric shape; and a display subsystem for receiving target data from the object location processing subsystem and selectively displaying the target data of the target object.

29. A method for detecting and tracking the location of a target object using signals transmitted by three or more transmitters, comprising the steps of:

receiving by a receiver direct signals broadcast by the three or more transmitters;

receiving by the receiver reflected signals broadcast by the three or more transmitters and reflected by the target object;

calculating a geometric shape for each of the three or more transmitters using the location of the transmitter and the receiver as fixed reference points and the target object as a point on the locus of the geometric shape; and calculating the location of the target object with the locus values of the geometric shapes.

30. The method of claim 29, wherein the step of calculating a geometric shape further comprises the steps of:

calculating the distance between the transmitter and the receiver;

calculating the distance traveled by the reflected signal from the transmitter to the receiver; and calculating the locus values for the geometric shape based on the calculated distances and the locations of the transmitter and receiver.

31. The method of claim 30, wherein the step of calculating the distance traveled by the reflected signal further comprises the step of calculating the time difference of arrival of the reflected signal.

32. The method of claim 29, wherein the step of calculating a geometric shape further comprises the step of calculating an ellipsoid.

33. The method of claim 29, wherein the step of calculating the location of the target object further comprises calculating the intersection of the geometric shapes.

34. The method of claim 29, further comprising the step of providing information indicating the location of the target to a display system for display.

35. A method for detecting and tracking the location of a target object using signals transmitted by one or more transmitters, each transmitter forming an interference effect pattern by the combination of a signal broadcast by the transmitter and a signal broadcast by the transmitter and reflected by the surrounding terrain, comprising the steps of:

receiving one or more signals broadcast by the one or more transmitters;

receiving one or more reflected signals broadcast by the one or more transmitters and reflected by the target object;

receiving the interference effect pattern signal reflected by the target object; and calculating the location of the target object using the direct signal, the reflected signal, as modified by and the interference effect pattern signal.

36. The method of claim 35, wherein the step of calculating the location of the target object comprises the steps of:

calculating range data for the target object from the direct and reflected signals;

calculating azimuth data for the target object from the direct and reflected signals; and calculating altitude data from the interference effect pattern signal.

37. The method of claim 36, further comprising the steps of:

comparing the range, azimuth, and altitude data with interference effect pattern data corresponding to the interference effect pattern reflected by the target object; and generating a corresponding altitude measurement from the comparison with the interference effect pattern data.

38. The method of claim 35, wherein calculating the location of the target object further comprises calculating the time difference of arrival of the one or more reflected signals.

39. The method of claim 35, wherein calculating the location of the target object further comprises calculating the frequency difference of arrival of the one or more reflected signals.

40. The method of claim 35, further comprising the step of monitoring the interference effect pattern signal for subsequent altitude calculations.

41. The method of claim 35, further comprising the step of calculating interference pattern data corresponding to the interference effect patterns formed around each of the one or more transmitters used for altitude calculations.

42. The method of claim 35, further comprising the step of providing the data indicating the location of the target object to a display system for display.

* * * * *